US008175902B2

(12) United States Patent
Song et al.

(10) Patent No.: US 8,175,902 B2
(45) Date of Patent: May 8, 2012

(54) SEMANTICS-BASED INTERESTS IN COMPUTING ENVIRONMENTS AND SYSTEMS

(75) Inventors: Yu Song, Pleasanton, CA (US); Sangoh Jeong, Palo Alto, CA (US); Doreen Cheng, San Jose, CA (US); Swaroop S. Kalasapur, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 703 days.

(21) Appl. No.: 12/343,393

(22) Filed: Dec. 23, 2008

(65) Prior Publication Data

US 2010/0161381 A1 Jun. 24, 2010

(51) Int. Cl.
*G06Q 10/00* (2012.01)
*G06Q 30/00* (2012.01)
*F41G 9/00* (2006.01)

(52) U.S. Cl. ............... 705/7.11; 705/14; 701/302
(58) Field of Classification Search ............. 705/7.11, 705/14; 701/302
See application file for complete search history.

(56) References Cited

U.S. PATENT DOCUMENTS

| | | | |
|---|---|---|---|
| 5,778,363 A | 7/1998 | Light et al. | |
| 6,341,305 B2 * | 1/2002 | Wolfe | 709/203 |
| 6,801,909 B2 * | 10/2004 | Delgado et al. | 1/1 |
| 6,839,680 B1 | 1/2005 | Liu et al. | |
| 6,912,386 B1 * | 6/2005 | Himberg et al. | 455/423 |
| 7,137,099 B2 | 11/2006 | Knight et al. | |
| 7,221,947 B2 * | 5/2007 | Casey | 455/456.1 |
| 7,336,964 B2 * | 2/2008 | Casey | 455/456.3 |
| 7,818,674 B2 * | 10/2010 | Koch | 715/736 |
| 7,970,637 B2 * | 6/2011 | Macbeth et al. | 705/7.11 |
| 7,979,445 B2 * | 7/2011 | Mason | 707/748 |
| 8,005,831 B2 * | 8/2011 | Hull et al. | 707/731 |
| 2002/0174199 A1 * | 11/2002 | Horvitz | 709/220 |
| 2003/0149604 A1 * | 8/2003 | Casati et al. | 705/7 |
| 2004/0049537 A1 | 3/2004 | Titmuss | |
| 2004/0093157 A1 * | 5/2004 | Muller et al. | 701/213 |
| 2004/0098469 A1 | 5/2004 | Kindo et al. | |
| 2004/0127253 A1 * | 7/2004 | Hauptvogel et al. | 455/556.2 |
| 2004/0230994 A1 * | 11/2004 | Urdang et al. | 725/88 |
| 2005/0034078 A1 * | 2/2005 | Abbott et al. | 715/740 |
| 2005/0201392 A1 * | 9/2005 | Tam et al. | 370/401 |

(Continued)

OTHER PUBLICATIONS

Situational, consumer, and retailer factors affecting Internet, catalog, and store shopping Gehrt, Kenneth C; Yan, Ruoh-Nan International Journal of Retail & Distribution Management v32n1 pp. 5-18 2004.*

(Continued)

*Primary Examiner* — Elaine Gort
*Assistant Examiner* — Ashford S Hayles
(74) *Attorney, Agent, or Firm* — Beyer Law Group LLP

(57) ABSTRACT

An input situation can be represented by at least a first context variable. Data that includes interest values for multiple context variables can be provided and obtained. The obtained data can include a first data pertaining to the input situation and a second data pertaining to one or more other situations. It can be determined whether the first context variable is associated with a discrete range of values or a continuous range of values. At least a portion of data pertaining to the situations can be determined to be proximate data when the first context variable is associated with a continuous range of values. Based on the input situation and the proximate data, an interest value for the first input situation can be determined as a prediction of the interest in the input situation.

31 Claims, 8 Drawing Sheets

U.S. PATENT DOCUMENTS

| | | | |
|---|---|---|---|
| 2005/0219069 | A1 | 10/2005 | Sato et al. |
| 2006/0020662 | A1 | 1/2006 | Robinson |
| 2007/0078849 | A1* | 4/2007 | Slothouber .................... 707/5 |
| 2007/0112360 | A1 | 5/2007 | De Deyne et al. |
| 2007/0118498 | A1* | 5/2007 | Song et al. .................... 707/1 |
| 2007/0136264 | A1* | 6/2007 | Tran ................................ 707/4 |
| 2007/0207782 | A1 | 9/2007 | Tran |
| 2007/0290841 | A1* | 12/2007 | Gross .................... 340/539.13 |
| 2008/0097822 | A1 | 4/2008 | Schigel et al. |
| 2008/0172274 | A1* | 7/2008 | Hurowitz et al. ................ 705/8 |
| 2008/0214156 | A1 | 9/2008 | Ramer et al. |
| 2008/0248801 | A1 | 10/2008 | Fletcher et al. |
| 2008/0281687 | A1* | 11/2008 | Hurwitz et al. ................ 705/14 |
| 2008/0294621 | A1 | 11/2008 | Kanigsberg et al. |
| 2008/0294622 | A1 | 11/2008 | Kanigsberg et al. |
| 2008/0294624 | A1 | 11/2008 | Kanigsberg et al. |
| 2009/0037355 | A1 | 2/2009 | Brave et al. |
| 2009/0117881 | A1* | 5/2009 | Deshpande ................ 455/414.1 |
| 2009/0125462 | A1 | 5/2009 | Krishnaswamy et al. |
| 2009/0125517 | A1 | 5/2009 | Krishnaswamy et al. |
| 2009/0271271 | A1* | 10/2009 | Johnson .................... 705/14.58 |
| 2009/0276377 | A1* | 11/2009 | Dutta et al. .................... 706/12 |
| 2010/0004997 | A1* | 1/2010 | Mehta et al. ................ 705/14.66 |
| 2010/0076777 | A1* | 3/2010 | Paretti et al. .................... 705/1 |
| 2010/0106603 | A1* | 4/2010 | Dey et al. .................... 705/14.63 |
| 2010/0161380 | A1 | 6/2010 | Song et al. |
| 2010/0161544 | A1 | 6/2010 | Song et al. |
| 2010/0198604 | A1 | 8/2010 | Song et al. |
| 2011/0039524 | A1* | 2/2011 | Gross .................... 455/414.1 |
| 2011/0153452 | A1* | 6/2011 | Flinn et al. .................... 705/26.7 |
| 2011/0246070 | A1* | 10/2011 | Fitzpatrick et al. ........... 701/300 |

OTHER PUBLICATIONS

Oku et al. "Context-aware SVM for context-dependent information." Proceedings of the 7$^{th}$ International Conference on Mobile Data Management (MDM '06), 2006.

Rack et al. "Context-aware, ontology-based recommendation." Proceedings of the International Symposium on Applications and the Internet Workshops (SAINTW'06), 2005.

Woerndl et al. "Utilizing physical and social context to improve recommender systems." IEEE International Conferences on Web Intelligence and Intelligent Agent Technology Workshops, 2007.

Woerndl et al. "A hybrid recommender system for context-aware recommendations of mobile applications." IEEE 2007.

Ricci et al. "Acquiring and revising preferences in a critique-based mobile recommender system." IEEE Computer Society, 2007.

Zhang et al. "Spontaneous and context-aware media recommendation in heterogeneous spaces." IEEE 2007.

Cho et al., "Minimum Sum-Squared Residue Co-clustering of Gene Expression Data", Proceedings of the Fourth SIAM International Conference on Data Mining (SDM), pp. 114-125, Apr. 2004.

Madeira et al. "Biclustering algorithms for biological data analysis: a survey." IEEE Transactions on Computational Biology and Bioinformatics, vol. 1, issue 1, pp. 24-45, 2004.

Chen et al., "A Survey of Context-Aware Mobile Computing Research," Dartmouth Computer Science Technical Report TR2000-381, Dartmouth College, 2000.

Herlocker et al., "An Algorithmic Framework for Performing Collaborative Filtering."In Proc. of SIGIR, 1999.

Deshpande et al. "Item-based top-n recommendation algorithms." in Proc. of IEEE MDM '06, 2006.

J.A. Flanagan. "Unsupervised clustering of context data and learning user requirements for a mobile device." 5$^{th}$ International and Interdisciplinary Conference on Modeling and Using context (CONTEXT-05), pp. 155-168, 2005.

J.B. MacQueen. "Some Methods for classification and analysis of multivariate observations." Proceedings of 5$^{th}$ Berkeley Symposium on Methematical Statistics and Probability, Berkeley, University of California Press, 1:281-297, 1967.

Gersho et al. "Vector Quantization and Signal Compression" chapters 2-4, Kluwer Academic Press, 1992.

Linde et al. "An algorithm for vector quantizer design." IEEE Transactions on Communications, vol. Com-28, No. 1, Jan. 1980.

Mobasher et al. "Semantically Enhanced Collaborative Filtering on the Web." AAI Workshop on Semantic Web Personalization (SWP 2004).

Leung et al. "Applying Cross-Level Association Rule Mining to Cold-Start Recommendation/" Web Intelligence and Intelligent Agent Technology, 2007.

Szomszor et al. "Folksonomies, the Semantic Web, and Movie Recommendations," 4$^{th}$ European Semantic Web Conference, 2007.

Park et al. "Naïve Filterbots for Robust Cold-Start Recommendations," KDD 2006.

Good et al. "Combining Collaborative Filtering with Personal Agents for Better Recommendations," AAAI/IAAI, 1999.

Office Action dated Nov. 5, 2010 from U.S. Appl. No. 12/343,392.

Final Office Action dated Feb. 28, 2011 from U.S. Appl. No. 12/343,392.

Tong et al., "Support Vector Machine Active Learning with Application to Text Classification," Journal of Machine Learning Research, 2001, pp. 46-66.

Office Action dated Jun. 30, 2011 from U.S. Appl. No. 12/343,395.

Office Action dated Dec. 27, 2011 from U.S. Appl. No. 12/363,662.

Notice of Allowance dated Jan. 5, 2012 from U.S. Appl. No. 12/343,395.

* cited by examiner

| CONTEXT: PLACE | CONTEXT: TIME | INTEREST IN GAME | INTEREST IN NEWS |
|---|---|---|---|
| 0 1 (work) | 0 0 1 (evening) | 1 | 2 |
| 0 1 (work) | 0 0 1 (evening) | 2 | 3 |
| 1 0 (home) | 0 0 1 (evening) | 3 | 3 |
| 0 1 (work) | 0 0 1 (evening) | 4 | 3 |
| 1 0 (home) | 0 0 1 (evening) | 4 | 1 |
| 0 1 (work) | 0 1 0 (midday) | 3 | 2 |
| 0 1 (work) | 0 0 1 (evening) | 3 | 2 |
| 0 1 (work) | 1 0 0 (morning) | 1 | 2 |
| 0 1 (work) | 0 1 0 (midday) | x | 3 |

| | CONTEXT VARIABLE 1 | CONTEXT VARIABLE 2 | INTEREST OBJECT |
|---|---|---|---|
| 402a | SITUATION 1 | | INTEREST VALUE |
| 402b | SITUATION 2 | | INTEREST VALUE |
| | .... | | INTEREST VALUE |
| 402N | SITUATION N | | INTEREST VALUE |

Figure 4A

| | PLACE | TIME | INTEREST IN GAME |
|---|---|---|---|
| 410a | 0 1 (work) | 0 0 1 (evening) | 2.6 |
| 410b | 0 1 (work) | 0 1 0 (midday) | 3.3 |
| 410c | 0 1 (work) | 1 0 0 (morning) | 2 |
| 410d | 1 0 (home) | 0 0 1 (evening) | 3.5 |
| 410e | 1 0 (home) | 0 1 0 (midday) | 3.5 |
| 410f | 1 0 (home) | 0 1 0 (morning) | x |

Figure 4B

SEMANTICS-BASED INTERESTS IN COMPUTING ENVIRONMENTS AND SYSTEMS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

A popular task for many computing devices is to link people with relevant information. Different computing devices perform such linking in a variety of ways, depending on the needs of a particular application. Many people, for example, are accustomed to typing keywords into an Internet search engine to find desirable information. Visitors to an e-commerce site are often greeted with ads and recommendations tailored to their preferences. Particular computing devices derive such recommendations from a comparison between the visitor's past purchasing decisions and the purchasing decisions of other users.

The generation of recommendations in this manner can involve the processing of large amounts of user data. Various techniques have been used to optimize such processing. Some computing devices use fixed, predetermined rules that prioritize one type of user data over another in making a recommendation. Other computing devices, for example, pose direct questions to a user to determine what the user desires at a later time.

These approaches, while effective in many applications, have weaknesses. Direct questioning is often disliked by users and consumes time and system resources. Rules typically require updating and may be based on faulty assumptions.

Another weakness of current approaches is that they do not seem to generate recommendations based on multiple contexts such as time and location.

Accordingly, techniques that can help computing devices make better recommendations for one or more users would be useful.

SUMMARY OF THE INVENTION

Broadly speaking, the invention relates to computing system. More particularly, the invention pertains to techniques for predicting interest in an object of interest in a given a situation. A situation can, for example, refers to a specific set of one or more contexts, conditions and/or circumstances. One specific example of a situation would be "at home in the morning." Of course, numerous types of situations are possible.

An input situation can be represented by at least a first context variable. Data that includes interest values for multiple context variables can be provided and obtained. The obtained data can include a first data pertaining to the input situation and a second data pertaining to one or more other situations. It can be determined whether the first context variable is associated with a discrete range of values or a continuous range of values. At least a portion of data pertaining to the situations can be determined to be proximate data when the first context variable is associated with a continuous range of values. Based on the input situation and the proximate data, an interest value for the first input situation can be determined as a prediction of the interest in the input situation.

The invention can effectively take into account that useful, interest-related information can be derived from situations that are different but substantially similar to and/or overlapping with the given situation. To use one simple example, a better understanding of a user's interests at home in the evening may be obtained not only by analyzing the kind of interests that arise when a user is in that exact situation, but also by examining the user's interests in other situations, such as when the user is at home in the late afternoon.

In one embodiment, a first input situation (e.g., "at home in the evening") represented by a first context variable (e.g., "time") is obtained. Data that includes interest values for multiple context variables ("time," "place," etc.) is obtained. For instance, one type of data may indicate that on one day a user had a high level of interest in game applications in the evening at home, but on another day he had a moderately low level of interest in game applications in the same situation etc. The obtained data includes a first kind of data, which pertains to the first input situation and a second kind of data, which pertains to one or more other situations. A determination is made as to whether the first context variable is associated with a discrete range of values or a continuous range of values. For example, in some but not all embodiments, the context variable "time" may be regarded as a continuous range of values, because of time's sequential nature. At least a portion of the second kind of data is determined to be proximate data when it is determined that the first context variable is associated with a continuous range of values. Based on the first kind of data and this proximate data, an interest value for the first input situation is generated.

This proximate data may be determined based on a variety of criteria. For example, data may be considered proximate because it relates to a continuous range of values and because it pertains to specific values that are "in close proximity" to the value in question. A particular embodiment, for instance, may involve generating an interest value that indicates a user's interest in, say, gaming applications when the user is at home in the evening. Data may be available showing the user's changing levels of interest in game applications both when the user is at home in the evening and when the user is at home in the late afternoon. In this example, because time is considered to be a continuous sequence and because the periods "late afternoon" and "evening" can be understood as overlapping with one another, both kinds of data may be used to generate a more accurate prediction of the user's interest level in game applications when the user is at home in the evening.

Some embodiments of the invention may be used to generate situation-based interest rating components. These components may include interest values that indicate a level of interest in an object of interest in a specific situation. A specific example of such a component may indicate that a user has on average a moderately high interest level (indicated by a value of 3.45 from a range of 0 to 5) in spreadsheet applications at work in the morning. These components in turn can be used to predict interest values for other situations.

The invention can be implemented in a variety of ways, including, for example, a method, an apparatus, a computer readable medium, and a computing system (e.g., one or more computing devices). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4A depicts multiple situation-based interest rating components in accordance with various embodiments of the invention.

FIG. 4B depicts multiple exemplary situation-based interest rating components in accordance with various embodiments of the invention.

DETAILED DESCRIPTION OF THE INVENTION

Figure 1:
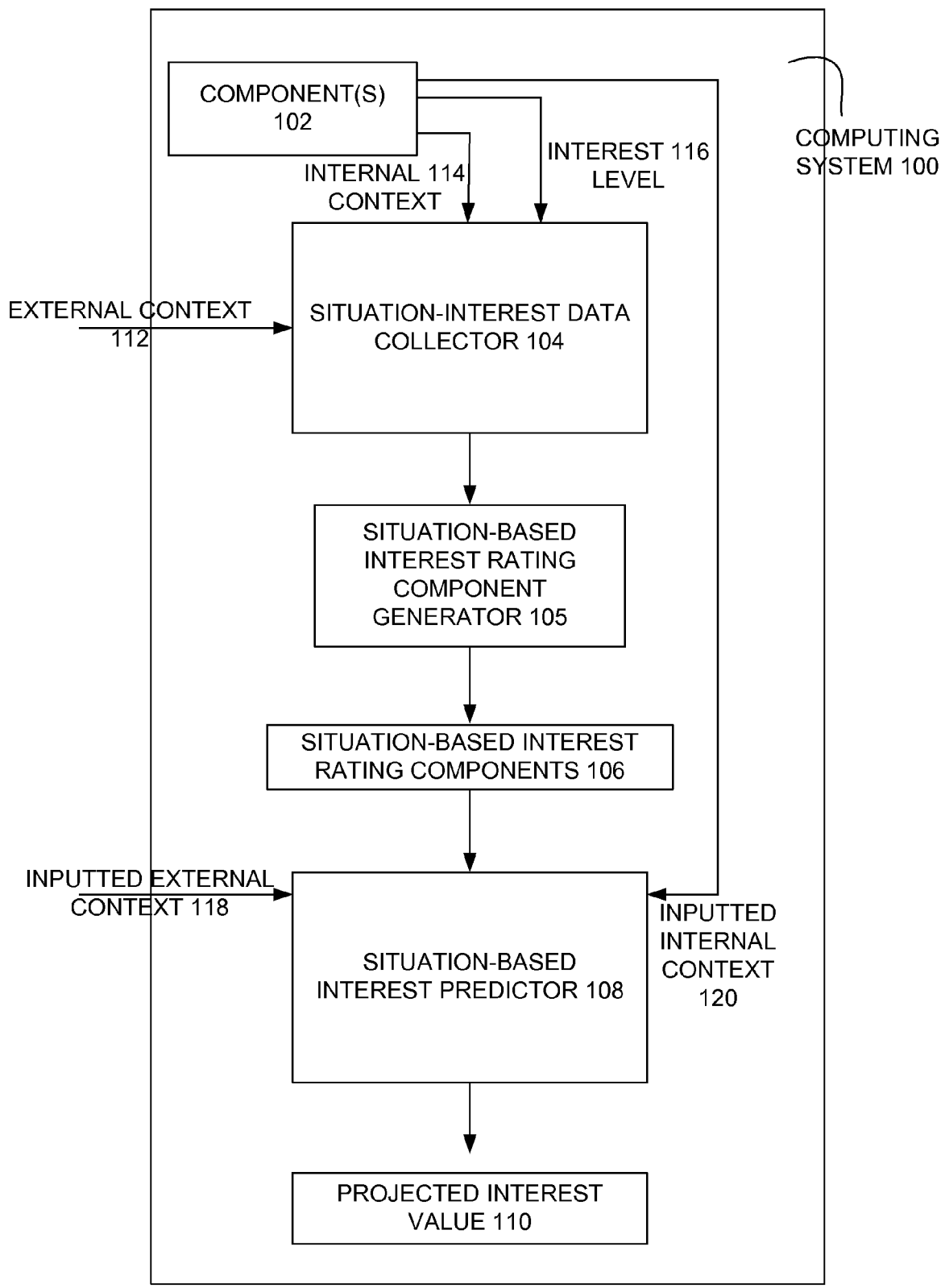
FIG. 1 depicts a computing system in accordance with various embodiments of the invention.

The invention pertains to techniques for predicting interest in an object of interest in a given a situation. A situation can, for example, refer to a specific set of one or more contexts, conditions and/or circumstances. One specific example of a situation would be "at home in the morning." Of course, numerous types of situations are possible.

An input situation can be represented by at least a first context variable. Data that includes interest values for multiple context variables can be provided and obtained. The obtained data can include a first data pertaining to the input situation and a second data pertaining to one or more other situations. It can be determined whether the first context variable is associated with a discrete range of values or a continuous range of values. At least a portion of data pertaining to the situations can be determined to be proximate data when the first context variable is associated with a continuous range of values. Based on the input situation and the proximate data, an interest value for the first input situation can be determined as a prediction of the interest in the input situation.

The invention can effectively take into account that useful, interest-related information can be derived from situations that are different but substantially similar to and/or overlapping with the given situation. To use one simple example, a better understanding of a user's interests at home in the evening may be obtained not only by analyzing the kind of interests that arise when a user is in that exact situation, but also by examining the user's interests in other situations, such as when the user is at home in the late afternoon.

In one embodiment, a first input situation (e.g., "at home in the evening") represented partly by a first context variable (e.g., "time") is obtained. Data that includes interest values for multiple context variables ("time," "place," etc.) is obtained. For instance, one type of data may indicate that on one day a user had a high level of interest in game applications in the evening at home, but on another day he had a moderately low level of interest in game applications in the same situation etc. The obtained data includes a first kind of data, which pertains to the first input situation and a second kind of data, which pertains to one or more other situations. A determination is made as to whether the first context variable is associated with a discrete range of values or a continuous range of values. For example, in some but not all embodiments, the context variable "time" may be regarded as a continuous range of values, because of time's sequential nature. At least a portion of the second kind of data is determined to be proximate data when it is determined that the first context variable is associated with a continuous range of values. Based on the first kind of data and this proximate data, an interest value for the first input situation is generated.

This proximate data may be determined based on a variety of criteria. For example, data may be considered proximate because it relates to a continuous range of values and because it pertains to specific values that are "in close proximity" to the value in question. A particular embodiment, for instance, may involve generating an interest value that indicates a user's interest in, say, gaming applications when the user is at home in the evening. Data may be available showing the user's changing levels of interest in game applications both when the user is at home in the evening and when the user is at home in the late afternoon. In this example, because time is considered to be a continuous sequence and because the periods "late afternoon" and "evening" can be understood as overlapping with one another, both kinds of data may be used to generate a more accurate prediction of the user's interest level in game applications when the user is at home in the evening.

Some embodiments of the invention may be used to generate situation-based interest rating components. These components may include interest values that indicate a level of interest in an object of interest in a specific situation. A specific example of such a component may indicate that a user has on average a moderately high interest level (indicated by a value of 3.45 from a range of 0 to 5) in spreadsheet applications at work in the morning. These components in turn can be used to predict interest values for other situations.

As noted above, various techniques exist for making recommendations on behalf of a user. These techniques are effective in certain circumstances but have weaknesses as well. Some of these techniques, for example, require direct feedback from users about their interests or utilize fixed, predetermined rules that prioritize one type of user data over another. Certain techniques do not take into account multiple contexts (e.g., time and location) in predicting the interests of a user.

In generating a recommendation on behalf of a user, it can be helpful to take into account particular characteristics of a given situation. This concept will be elaborated upon below using a simple example, although of course embodiments of the invention may diverge from this example in a variety of ways. In this example, there may be data indicating the amount of interest a user has in consumer electronics in various situations. The data may indicate that the user's interest vacillates from time to time and from situation to situation. For example, the data may illustrate changing patterns of interest in electronics in the middle of the day, in the morning and night, as well as when the user is in a variety of locations. Given this mixed data, improved methods for accurately predicting the interest level of a user in electronics, given a particular situation, is desirable. One way of improving this prediction process is to take into account the nature of the context variables that make up the various situations.

In this example, the situation pertains at least to the context variables "time" and "place." For the purposes of this example, these context variables differ in that "time" seems to have a sequential, continuous nature and "place" does not. That is, attempts to categorize "time" into discrete values or divisions may overemphasize the differences between such divisions. For instance, the context variable "time" may have possible context values such as "evening," "afternoon" and "morning," but it is well understood that times that fall into the category "evening," such as the early evening, may have much in common with times that fall into the category "afternoon," such as the late afternoon. In other words, if it is assumed that the time of day may influence a user's interest in electronics, then under certain circumstances that influence could be assumed to be similar between overlapping and/or highly related divisions or values of time. The invention can take the continuous nature of a context variable into account when estimating an interest in an object of interest given a particular situation.

One embodiment of the invention is presented in FIG. 1. FIG. 1 illustrates computing system 100, which includes one or more components 102, situation-interest data collector 104, situation-based interest rating component generator 105, and situation-based interest predictor 108. In the illustrated embodiment, components 102 run applications, observe processes in the system and/or store logs of past activity etc. Computing system 100 has one or more processors (not shown) and may be configured in a variety of ways, depending on the needs of a particular application. For example, computing system 100 may be a mobile device, a server and one or more clients and/or multiple computer devices.

Situation-interest data collector 104 receives data relating to internal contexts 114 from components 102 and external contexts 112 from the outside environment. Examples of internal contexts include the number and type of applications that are currently running, modes of operation, logs of past user behavior and/or timing information. Examples of external contexts may include data relating to location, speed, motion, proximity to a device, GPS signals and/or temperature. Situation-interest data collector 104 may also correlate such contextual data with additional information characterizing interests 116 on the part of one or more users (i.e. types of interests, the intensities of those interests, user actions implying specific interests etc.). Other types of data may be collected as well.

Situation-based interest rating component generator 105 analyzes the data collected by situation-interest data collector 104 and generates situation-based interest rating components 106. In the illustrated embodiment, the situation-based interest rating components 106 capture situation-based interest patterns in the collected data. For instance, one of the situation-based interest rating compounds 106 may indicate that the user has on average a moderately high level of interest (indicated by a numerical value of 4.35 on a range of 0 to 5) in game applications when he or she is at home in the evening.

To generate such interest values for the situation-based interest rating components 106, situation-based interest rating component generator 105 takes into account the characteristics of various contexts. It may determine, for example, whether various internal and external contexts 114 and 112 are related to continuous or discrete ranges. If a context is deemed to be associated with a continuous range (e.g., "time"), then situation-based interest rating component generator 105 may base an interest value calculation for a particular situation not just on data pertaining to that situation (e.g., "morning"), but also on data pertaining to situations that are very similar and/or overlapping with respect to that continuous context (e.g. "morning" as well as "midday," because "midday" is in close proximity to "morning").

Situation-based interest rating components 106 are then received by situation-based interest predictor 108. Situation-based interest predictor 108 also receives additional input external contexts 118 and input internal contexts 120. Situation-based interest predictor 108 uses this data to generate predicted interest value 110. In the illustrated embodiment, predicted interest value 110 is an estimation of a degree of interest in an object of interest that would occur in a situation represented by input external contexts 118 and input internal contexts 120. To use a very simple example, situation-based interest predictor 108 may receive input relating to a location-based external context (e.g., "workplace") and a time-based internal context (e.g., "the afternoon"). Based on situation-based interest rating components 106 and these inputted context values, the situation-based interest predictor 108 in this example may predict that the interest level in, say, a gaming application would be "high" as opposed to "medium" or "low." To predict such values, the situation-based interest predictor 108 may encode some or all of the situation-based interest rating components 106 as vectors and selectively calculate distances between them. Of course, the characteristics and operations of the situation-based interest predictor 108 may vary widely, depending on the needs of a particular application.

Figure 2:
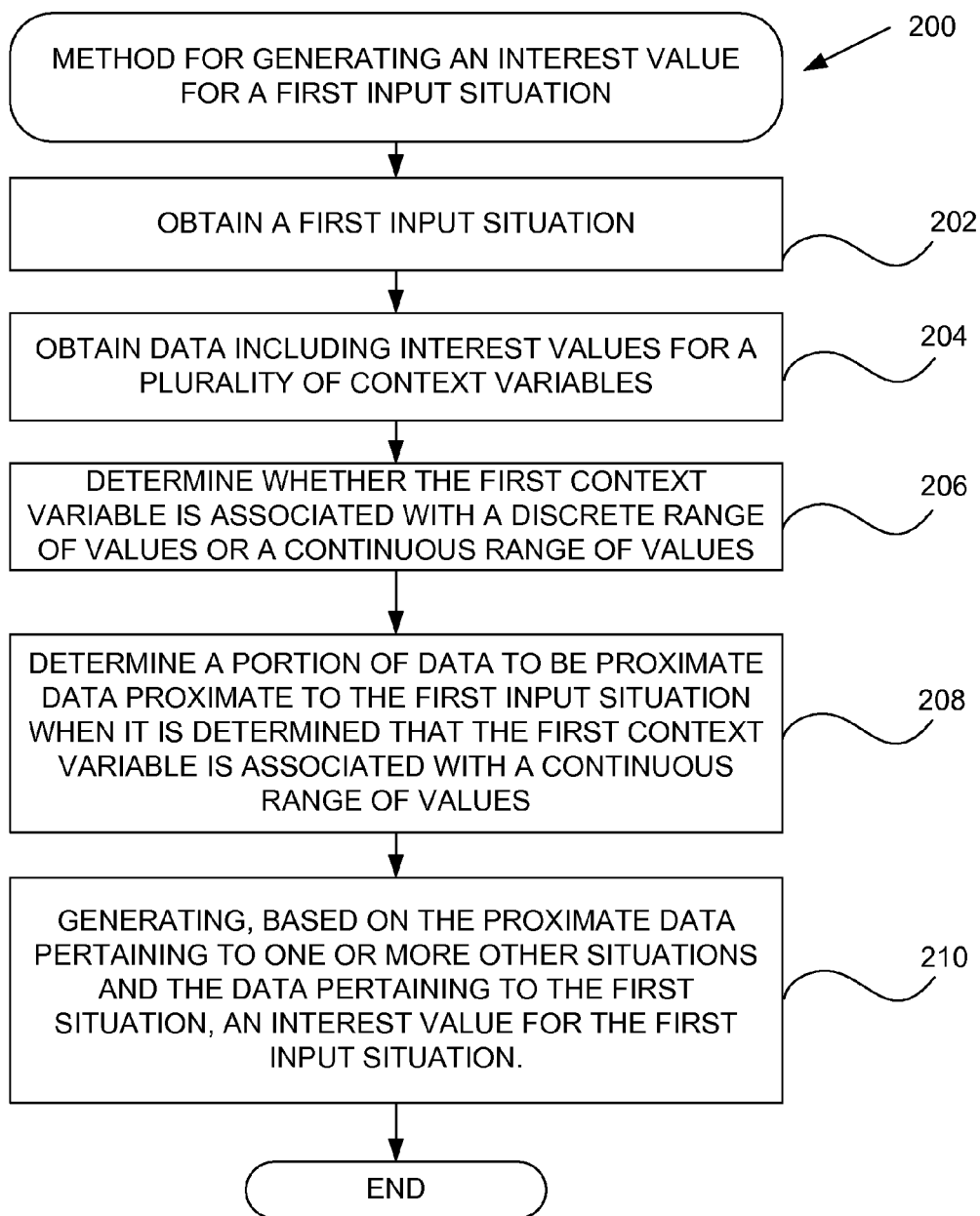
FIG. 2 depicts a method for determining an interest value for a situation in accordance with various embodiments of the invention.

One embodiment of the invention, illustrated in FIG. 2, pertains to a method 200 that, given a certain situation, predicts an interest level in an interest object. The operations in FIG. 2 will be elaborated upon in further detail with reference to FIGS. 3A to 4B. However, those skilled in the art will readily appreciate that the detailed description given herein with respect to these figures is for explanatory purposes as the invention extends beyond these limited embodiments. The method begins with step 202 of FIG. 2, which involves obtaining a first input situation represented by at least a first context variable.

Figure 3A:
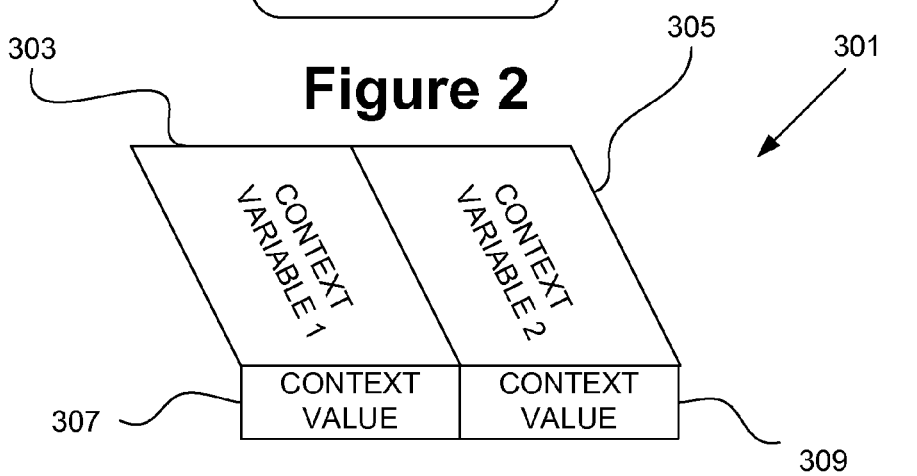
FIG. 3A illustrates a situation with multiple context variables and values in accordance with various embodiments of the invention.

FIG. 3A illustrates a particular embodiment of an input situation 301. Situation 301 reflects one or more contexts, circumstances and/or conditions (e.g., "in the evening at home," "in motion near a specific retail outlet" etc.). In the illustrated embodiment, situation 301 has two context variables 303 and 305 (e.g., "time," "place" etc.). Each context variable 303 and 305 has one or more values from a range of possible context values (e.g., a context variable "time" may have values "morning," "midday," "afternoon," etc.). The context variable 303 of situation 301, for example, has context value 307. The context variable 305 has context value 309. In certain embodiments, there are multiple different situations that have the same context variables, but different context values. For example, two different situations may have context variables "time" and "place," but one may pertain to "afternoon at work" and the other may pertain to "morning at home."

In step 204 of FIG. 2, data including interest values for multiple context variables is obtained. In the illustrated embodiment, the data of step 204 shares at least one context variable with the input situation of step 202. For example, if the input situation of step 202 has a context variable "time," then the obtained data may pertain to the context variable "time" as well and may offer data involving various periods of time (e.g., "morning," "afternoon," etc.). Such data may take a variety of different forms. For example, certain types of data involve a linking between a specific level of interest in an interest object (e.g., a high level of interest in pop music) and two or more context values (e.g., "being at home in the evening"). Other types of data may be more or less specific and/or integrate other factors. The data may be drawn from the actions of one or more users, the tracking or observation of patterns of behavior, and/or be estimates. The data can be formatted and stored in a variety of ways as well. For example, the data can take the form of multiple data associations, in which context variables, which represent one or more situations, are associated with specific interest levels.

Figures 3B, 3C:
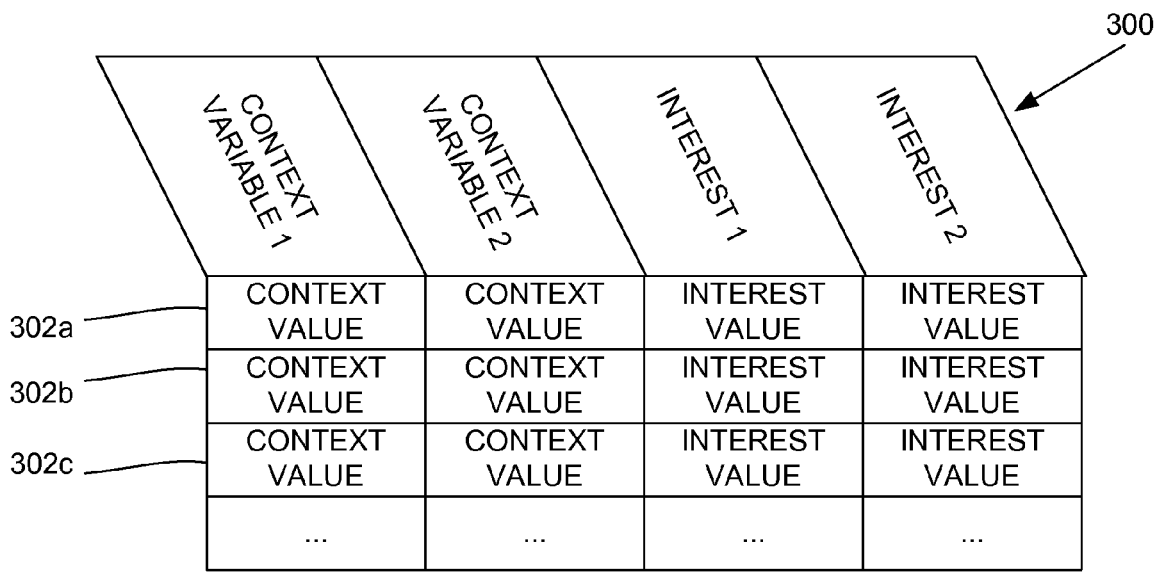
FIG. 3B illustrates a set of data associations in accordance with various embodiments of the invention.
FIG. 3C illustrates an exemplary set of data associations in accordance with various embodiments of the invention.

FIG. 3B illustrates an example of one type of data association. FIG. 3B includes data association set 300, which includes at least data associations 302a-c, which are structured as rows in the illustrated embodiment. Each data association 302a-c has two associated context variables and two interests. (Of course, more or fewer context variables and/or interests are possible.) Each context variable can be filled with one or more possible context values, which in some embodiments are limited to a specific range of discrete context values. Alternatively, context values may be drawn from an unlimited number of values. Interest values can be similarly broad or constrained. In the illustrated embodiment, the context variables 1 and 2 help characterize a situation and the interests 1 and 2 help measure a degree of interest in two different interest objects.

A simple, more detailed example of data associations 300 is provided in FIG. 3C. In the illustrated embodiment, 8 data associations 304a-i are presented in rows. The context variables 306 and 308 relate to place and time respectively. The interest objects include an interest 310 in a game application and an interest 312 in a news application. Each data association 304a-i has context values for the context variables and interest values for the interest objects. For example, data association 304a has context variable "place" with the context value "work", context variable "time" with the context value "evening" and an interest level of 1 in a gaming application and an interest level of 2 in a news application. In this example, the interest levels are drawn from the range of integers between 0 and 4. This data association could be taken to mean, for example, that at one point in time, a user evidenced a low level of interest in a gaming application but a slightly higher level of interest in a news application at work during the evening. Other interpretations and relationships between the various values and variables are also possible. Other data associations may have similar or different values.

For example, data association 304i has an unknown value, depicted by an "x" in place of a game-related numerical interest value. This indicates that the game-related interest value was unknown, missing, unclear and/or insufficiently supported when data association 304i was formed.

It should be appreciated that the data associations, variables and/or values may be configured in a variety of ways, depending on the needs of a particular application. In certain embodiments, context values and interest levels may be predefined and/or limited to a discrete number of values. For example, in the example of FIG. 3C, the context values for the context variables "place" and "time" are encoded as multi-dimensional, binary vectors (i.e. vectors that encode data in the form of multiple 0's and 1's or other equivalent values). Context variable "place" has two possible context values, "home" and "work," which are encoded as "1 0" and "0 1" respectively. Context variable time has three possible context values, "morning," "midday" and "night," which are encoded as "1 0 0", "0 1 0" and "0 0 1" respectively. This is referred to as 1-in-N encoding. In other words, for a specific context variable, N is an integer equal to the number of possible context values. Each context value for that variable is encoded as a vector with N binary values. In the illustrated embodiment, the context value vectors for a specific context variable are similar in that they have the same number of values, but each is unique in terms of where their respective 1 values are positioned. For instance, with regard to context variable 306 ("place"), context value "work" has a 1 in the second position, and context value "home" has a 1 in the first position. A variety of other encoding mechanisms are also possible. In the illustrated embodiment, such encoding helps to streamline later operations in method 200 of FIG. 2 and method 500 of FIG. 5, as will described later in this application.

In step 206 of FIG. 2, it is determined whether a certain context variable (e.g., "time" or "place") is associated with a discrete range of values or a continuous range of values. In particular embodiments, a continuous range of values are a range of values that are semantically understood to be sequential, continuous and/or overlapping. While a continuous range may be divided into distinct values in the interests of convenience, in certain embodiments at least some of these values are understood to be strongly affiliated with one or more other values. One example of this would be values associated with periods of time, such as "morning," "noon," "afternoon" and "evening." In some embodiments, it is understood that these categories are somewhat arbitrary and are not intended to imply that there are substantial differences between any data point that falls into one category and any data point that falls into another. To use a simple example, 10 a.m. may be placed in a "morning" category and 11 a.m. may be placed in a "noon" category, but it is well understood that the two times are highly similar to one another, because of the sequential, continuous nature of time.

Particular embodiments involve discrete ranges or groups of values, which refers to values that are deemed to not overlap and/or be substantially related to one another. One may readily imagine, for example, a context variable such as "location" having this quality. In this example, "location" may have discrete values such as "home" and "work." Semantically speaking and with respect to particular embodiments, terms like "home" and "work" are perceived not as being part of a sequential continuum, but rather as relatively unrelated, distinctive categories. For this reason, in certain embodiments the context variable "place" would be regarded as having a discrete range of values.

Particular embodiments, instead or in addition to classifying context variables as "continuous" or "discrete," determine whether values in a specific range of values are "affiliated" or "unaffiliated." The threshold question for such a determination is: are there values within the given range or group understood as having substantial similarities with one another for purposes of estimating specific interests related to those values? To use a simple example, in some embodiments the context variable "location" may be considered to be "unaffiliated," based on the assumption that values such as "work" and "home" do not have a relevant relationship to one another. This understanding of "location" mirrors the discussion above regarding discrete values. In other embodiments, however, the context variable "location" may embrace affiliated values such as "near retail outlet X," "near mall Y," "near a live Internet connection," and "at work." Particular embodiments may determine that, for instance, the first two values ("near retail outlet X," "near mall Y") are affiliated with one another, as are the latter two ("near a live Internet connection," "at work"). This categorization of a group of values as "affiliated" is based on the idea that different values of the same type can sometimes influence a person's interests in a similar manner.

Step 208 of FIG. 2 involves determining a portion of the data to be proximate data proximate to the first input situation when the first context variable is associated with a continuous range of values. A particular embodiment of the above step will be described below using a simple example. This example assumes that the input situation has two context variables, "place" and "time," which have the context values "work" and "evening." In this example, "time" is considered to be a context variable that is associated with a continuous/ affiliated range of values, which are "morning," "midday" and "night." "Place" is considered to be associated with a discrete/unaffiliated range of values.

FIG. 3C depicts various data associations 304a-i. In this example, step 208 involves determining which data associations 304a-i are proximate data proximate to the situation "at work in the evening." The concept of "proximate data" can involve a variety of criteria and characteristics, depending on the needs of a particular application. In this example, proximate data includes data associations whose "place" context variable is always "evening" and whose "time" context variable is different but within a predetermined distance from "evening." That is, because context variable "place" is regarded as discrete and/or unaffiliated, data with "place" values different from "work" will not be understood as proximate data. By contrast, because context variable "time" is regarded as continuous and/or affiliated, values that are different but within a predetermined distance from "evening" will be considered.

In this example, data association 304f is proximate data to the input situation "at work in the evening." This is because data association 304f shares the context value "work" with the input situation. Additionally, data association 304f has a context value "midday" for continuous context variable "time" that is not the same as but is in close proximity to "evening." That is, if the range of possible context values ("morning," "midday," "evening") is seen as a linear sequence with two ends, "midday" would be included in a one-sided band composed of values up to 1 value away from "evening." It should be appreciated that this concept of proximate data and proximity can vary, depending on the needs of a particular application. The band, for example, could be two-sided (e.g., the band around "midday" may include both "morning" and "night"). The distances could be measured along a linear sequence with two ends, a looped linear sequence, or in a space with two or more dimensions. The distances defining the boundaries of proximate data could be predetermined or automatically adjusted. The criteria used to determine proximate data may differ between different context variables and/ or context values. In certain instances, proximate date may exclude otherwise "qualified" data associations that have erroneous, unclear and/or insufficiently supported interest values.

In step 210, an interest value for the first input situation is generated based on the proximate data described in step 208 and data pertaining to the first input situation. In particular embodiments, this interest value indicates the estimated interest level of a user in an object of interest when the first input situation arises. Certain embodiments incorporate these interest values for various situations into situation-based interest rating components. Step 210 will be discussed in further detail using the components 400 and 410 of FIGS. 4A and 4B respectively.

FIG. 4A displays multiple situation-based interest rating components 400, which are arranged in rows. Each situation-based interest rating component, such as component 402a, associates a situation (represented by context variable 1 404 and context variable 2 406) with an interest object 408. More specifically, each situation-based interest rating component 400 is assigned to a different situation of N situations. Furthermore, each situation-based interest rating component 400 indicates an interest value 403, which indicates an intensity of an interest in interest object 408 when the corresponding situation arises.

The arrangement and configuration of the situation-based interest rating components 400 of FIG. 4A may vary, depending on the needs of a particular application. For example, each of the components 400 may contain fewer or more context variables, context values, interest objects, interest values and/ or other items. Any portion of each component 400 may be encoded as binary values, a vector and/or some other format. In particular embodiments, the number of situation-based interest rating components 400 is the same as the total number of possible situations (e.g., if situations are defined by 2 context variables with X and Y numbers of possible context values respectively, then the number of situation-based interest rating components would be XY). Under particular conditions, interest values and/or context values may be missing from certain situation-based interest rating components. In some embodiments, each situation-based interest rating component is associated with only one situation and/or one interest object. Particular embodiments involve components in which the number and/or type of context variables, possible context values, interest objects and/or possible interest levels are predefined and/or limited to a discrete number. To use a simple example, the context variable "time" may be expressed using 1 of only 6 context values, indicating different periods during the day. The situation-based interest rating components can be created, processed and/or stored in various kinds of hardware, software and/or both. Some embodiments involve such components in a computer readable medium, such as a hard drive or flash memory.

FIG. 4B is a simple example of situation-based interest components 410 that are based on the embodiment illustrated in FIG. 3C. FIG. 4B shows 6 situation-based interest rating components 410. Components 410 include context variable "time" 414, context variable "place" 416 and interest 418, which represents an interest in interest object "game." Context variable "time" 414 has two possible context values, "home" and "work." Context variable "place" 416 has three possible context values, "morning", "midday" and "evening." Interest 418 accommodates an unlimited range of values between 0 and 4.

Each of the situation-based interest rating components 410 of FIG. 4B associates an interest value with a different situation, although this is not a requirement. Component 410a, for example, estimates an interest in a game as 2.6 (from 0 to 4) arising in a situation involving "work" and "evening." Components 410b-e correspond to different situations involving different combinations of context values for context variables "place" and "time."

Situation-based interest rating components 410 may be determined in a wide variety of ways, depending on the needs of a particular application. In the particular embodiment illustrated in FIG. 4B, the interest values are derived from the data associations 304a-i in FIG. 3C in accordance with steps 208 and 210 of FIG. 2.

Situation-based interest rating component 410a of FIG. 4B will be used as an example. As noted earlier, component 410a represents the estimated interest in games (i.e., interest value of 2.6) that would arise in a specific situation (i.e., "at work in the evening"). In the illustrated embodiment, the interest value of 2.6 for component 410a is based on data associations 304a-i of FIG. 3C that meet the following criteria: 1) the data association is proximate data for the situation "at work in the evening," which, as described earlier in connection with step 208, is true for data association 304f; or 2) the data association corresponds to the situation for the component (e.g., "workplace in the evening,"), which is true for data associations 304a, 304b, 304d and 304g; and 3) the data association does not include data associations with unclear game-related data, which rules out data association 304i. As a result, the interest value of 2.6 is based on a simple average of the game-related interest values for the qualified data associations 304a, 304b, 304d, 304f and 304g, which is 1+2+4+3+3=13/5=approximately 2.6. The other interest values 411 for components 410b-e are determined in a similar manner. It should be appreciated that additional criteria may be considered in evaluating data and/or data associations. Additionally, the averaging calculation presents only one simple way of determining situation-based interest rating components 410. Various other techniques may also be used.

Figure 5:
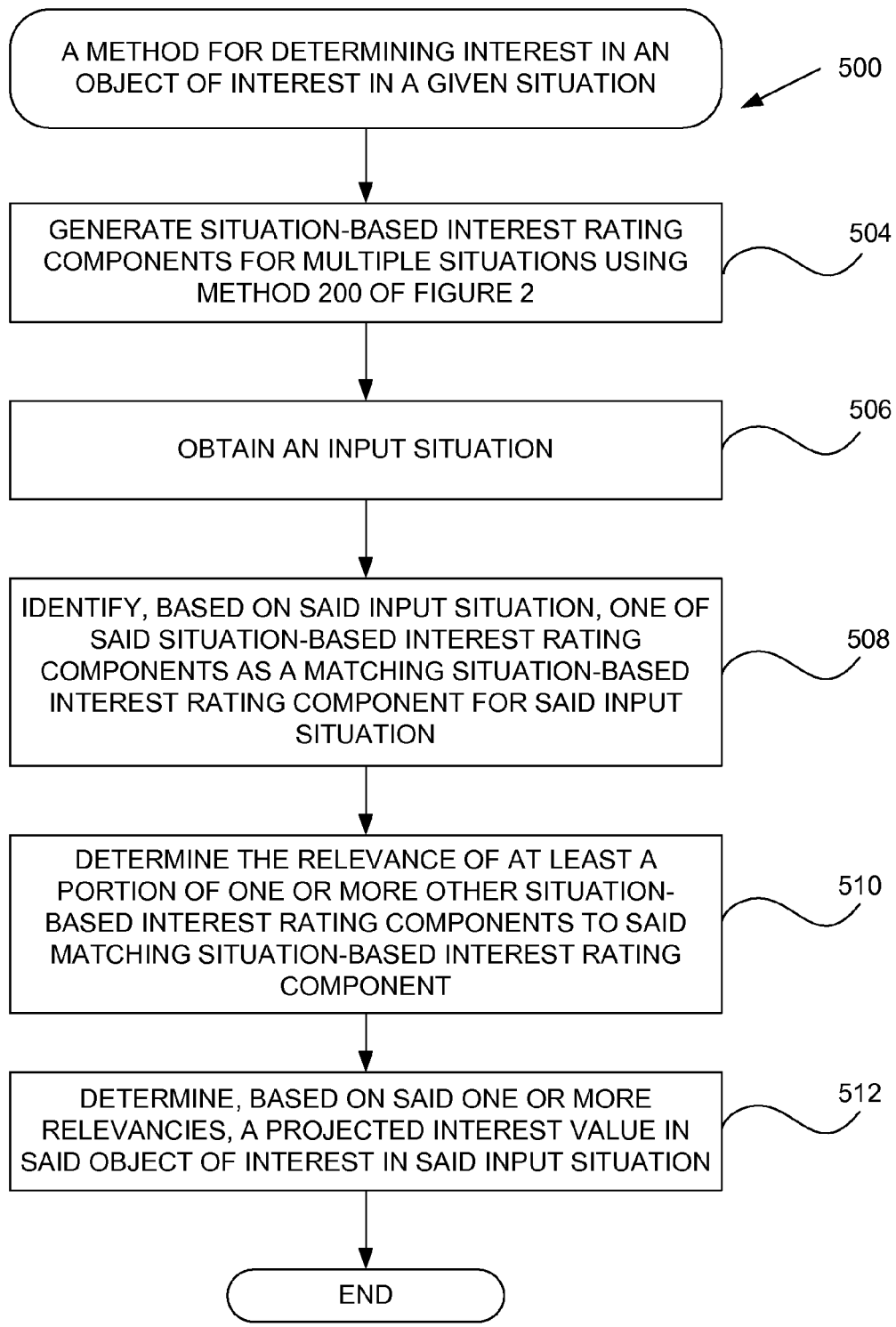
FIG. 5 depicts a method for determining interest in an object of interest in a given situation in accordance with various embodiments of the invention.

Once interest values for situation-based interest rating components are generated in the above manner, they may be used to predict additional interest values in objects of interest in various situations. Method 500 of FIG. 5 illustrates one such approach. The steps of FIG. 5 will be described in conjunction with FIGS. 3A-4B. In step 504, multiple situation-based interest rating components are generated for multiple situations using method 200 of FIG. 2.

In step 506 of FIG. 5, an input situation is received. This input situation can take on various forms and be derived from a variety of sources. For example, the input situation may analogous to the one described above in connection with FIG. 3A. In some embodiments, the number of possible input situations is similar to or exactly the same as the number of situation-based interest rating components and/or the number of possible situations associated with the components. The input situation, the situation-based interest rating components and/or the data associations may be limited to the same types of context variables and context values. The input situation may characterize a situation from the past, present, future and/or be selected arbitrarily. To use a simple example, the input situation in one embodiment may involve recognizing that a user is currently at "home" in the "morning."

In step 508 of FIG. 5, one of the situation-based interest rating components 410 of FIG. 4A is identified as a matching situation-based interest rating component. In particular embodiments, the matching component is the one whose situation matches partly or completely that of the input situation. To use the example presented in FIG. 4B, if the input situation is "home in the morning," then the matching situation-based interest rate component would be component 410f. This identification operation, however, need not be based solely on a situation. In particular embodiments, it is based on entirely different or additional factors, such as the interest value.

In step 510 of FIG. 5, the relevance of at least a portion of one or more other situation-based interest rating components to the matching situation-based interest rating component is determined. This relevance calculation may be performed in a variety of ways, depending on the needs of a particular application. Particular embodiments involve determining relevancies of only portions of components to portions of the matching component, such as only the situation-related portions, the interest value-related portions or both. The determining of relevancies could also involve components as a whole. Some embodiments involve calculating one or more distances between the matching situation-based interest rating component and other components. With respect to the example presented in the previous paragraph, this would mean that distances would be calculated between matching component 410f of FIG. 4B and at least one of the other components 410a-e.

The distance calculation may be performed in a variety of ways. One example is hereby presented with reference to FIG. 4B. As discussed earlier, the context values for each of the situation-based interest rating components 410 is encoded as vectors. (It should be appreciated that any portion, including the interest value portion of each component, may be encoded in vector form.) For example, situation-based interest component 410a includes context value "work," which is encoded as the vector 0 1, and the context value "night," which is encoded as vector 0 0 1. In a similar vein, the situation of component 410f is encoded as "home" (vector 1 0) and "morning" (vector 0 1 0.) One way to calculate a distance between these two vectors is to combine the context value vectors for each component to form two larger vectors, and to calculate a distance between those vectors. In the illustrated example, calculating the distance between component 410a and 410f means calculating a distance between the vector 0 1 0 0 1 (the combined context value vectors for component 410a) and the vector 1 0 0 1 0 (the combined context value vectors for component 410f). The inputs to the distance calculation need not be limited to situation-related vectors. They may include interest values, non-binary vectors, and/or other factors, depending on the needs of a particular application. Thus, the vectors used in a distance calculation may include values other than situation-based ones, such as interest values.

The aforementioned distance may be calculated using a variety of different formulas. For example, two possibilities include a Euclidean distance formula and a cosine distance formula. Other formulas or algorithms are also possible. The cosine distance, for example, between a vector A, defined as $[a_1\ a_2\ \ldots\ a_n]$, and a vector B, defined as $[b_1\ b_2\ \ldots\ b_n]$, may be calculated as follows:

$$\text{cosine } D(A, B) = \frac{a_1 b_1 + a_2 b_2 + \ldots + a_n b_n}{\left(\sqrt{a_1^2 + a_2^2 + \ldots + a_n^2}\right)\left(\sqrt{b_1^2 + b_2^2 + \ldots + b_n^2}\right)}$$

In some embodiments of the above equation, 0 values are converted into very small values. The above equation may be modified or reformulated, depending on the needs of a particular application.

The number of distance and/or relevance determinations may vary, depending on the needs of a particular application. For example, in FIG. 4B the relevance of matching component 410f to all other components (i.e. at least components 410b-e) may be determined. In alternative embodiments, this determination is not applied to certain components that lack sufficient interest value data. Various factors and conditions may be involved in determining whether the relevance determination is applied to a certain situation-based interest rating component or not.

Figure 6:
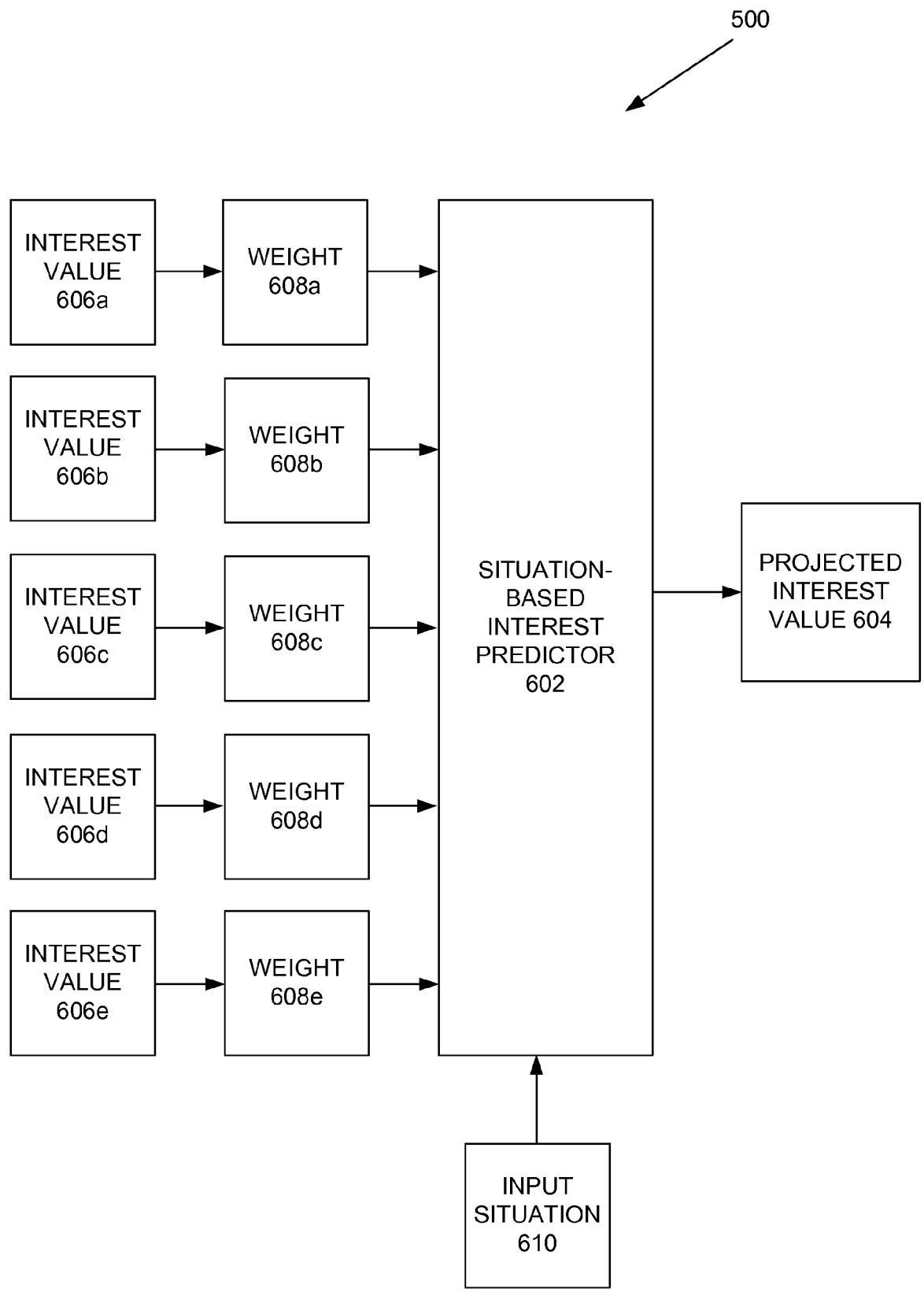
FIG. 6 depicts a block diagram of a situation-based interest predictor, interest values and their associated weights in accordance with various embodiments of the invention.

In step 512 of FIG. 5, a projected interest value in the object of interest is determined based on the relevance determinations. This step is elaborated upon in further detail in FIG. 6. FIG. 6 presents situation-based interest predictor 602, which generates projected interest value 604. As inputs, situation-based interest predictor 602 receives input situation 610, which was discussed in step 506 of FIG. 5, and interest values 606a-e, which are weighted by weights 608a-e, respectively.

The interest values 606a-606e are derived at least partly from the interest values of specific situation-based interest rating components, such as interest values 403 of components 400 of FIG. 4A. In the illustrated embodiment, weights 608a-e influence the degree to which each associated interest value contributes to projected interest value 604. Interest values and weights may be selected and/or calculated in a variety of ways, depending on the needs of a particular application. In the illustrated embodiment of FIG. 6, the weights are determined using the distance calculations described earlier. In this simple example, the number of interest values 606a-e and weights 608a-e are also determined by the distance calculations. More specifically, the weights used in the situation-based interest predictor 602 to generate projected interest value 604 are derived from those situation-based interest rating components 400 that were closest in distance to the matching component. The number of situation-based interest rating components to be used in such a derivation may be limited to a predefined number K. Thus, in a simple example where K=5 and the matching situation-based interest rating component was component 402a of FIG. 4, interest values 606a-e of FIG. 5 match the interest values of those 5 components of components 400 that are closest to component 402a. One of the K components may or may not be the matching situation-based interest rating component. Factors other than closeness may be used to determine the source of interest values 606a-e. K may be smaller, larger, equal to the total number of situation-based interest rating components, predetermined and/or automatically generated.

In certain embodiments, once weights 608a-608e are calculated, they can be inputted into the situation-based interest predictor 602 to generate projected interest value 604. The formulas used to predict the interest value 604 may vary greatly, depending on the needs of a particular application. One approach is to use a weighted sum. The following formula, for example, makes a prediction for an interest value based on the following weighted sum equation:

$$P = \frac{\sum_{i=1}^{K} V_i \times \text{relevance}(C_i, S)}{\sum_{i=1}^{K} \text{relevance}(C_i, S)}$$

In the above exemplary equation, P is the predicted interest value for a specific interest object. V refers to the interest value of the i-th component of K situation-based interest rating components. The function "relevance" relates to the relevance calculations described above e.g., a distance equation. S refers to the input situation. C refers to the i-th situation-based interest rating component.

Situation-based interest level predictor 602 of FIG. 6 may produce one or more predictions. In particular embodiments it will predict interest levels for a wide range of interest objects (e.g., given that the user is at "home" in "midday," his interest in TV is high, his interest in sports is high, his interest in spreadsheet applications is low, etc.). Particular embodiments involve interest level predictions for hundreds or thousands of interest objects.

In some cases, it may be determined that there is insufficient data to support a prediction of an interest value related to a particular interest object. Some embodiments involve predicting an interest value using the interest values predicted for one or more other interest objects (e.g., a predicted interest in pop music may be based on a predicted interest in classical music, music applications or a combination of other interest objects). Another possibility is to predict an interest value in an interest object based on evaluating and/or averaging the range of possible interest values for that interest object. To use a simple example, if an interest in game applications is measured on a scale of 0 to 6, a 3 may be predicted for a user, since it is the midpoint of the range. Other approaches are also possible.

The prediction equation may take a number of different forms, depending on the needs of a specific application. For example, the prediction equation may involve various kinds of context values, interest levels, interest objects, weights, situation-based interest rating components, variables and/or values. The weighted sum used above may be modified or replaced entirely with another equation. In certain embodiments, the prediction may be informed by factors other than the components, situations, values and weights referenced in a relevance determination, distance calculation and/or a weighted sum formula. One embodiment may involve using predictions of various interest levels to return better search results to a user accessing a search engine. The predictions may be based not only on the context values characterizing the situation of the user (e.g., the time of day, the user's location and activity logs, etc.), but also on the keywords the user is typing in as well as other types of data. In one example, the prediction could be improved by reviewing a history of the user's past searches and/or page views and determining from them additional keywords and/or data that may help improve the accuracy of the search. In this example, such keywords and data may influence the predictions, but may not be used in a weighted sum formula and/or included in a set of probability values as described earlier.

Figure 7A:
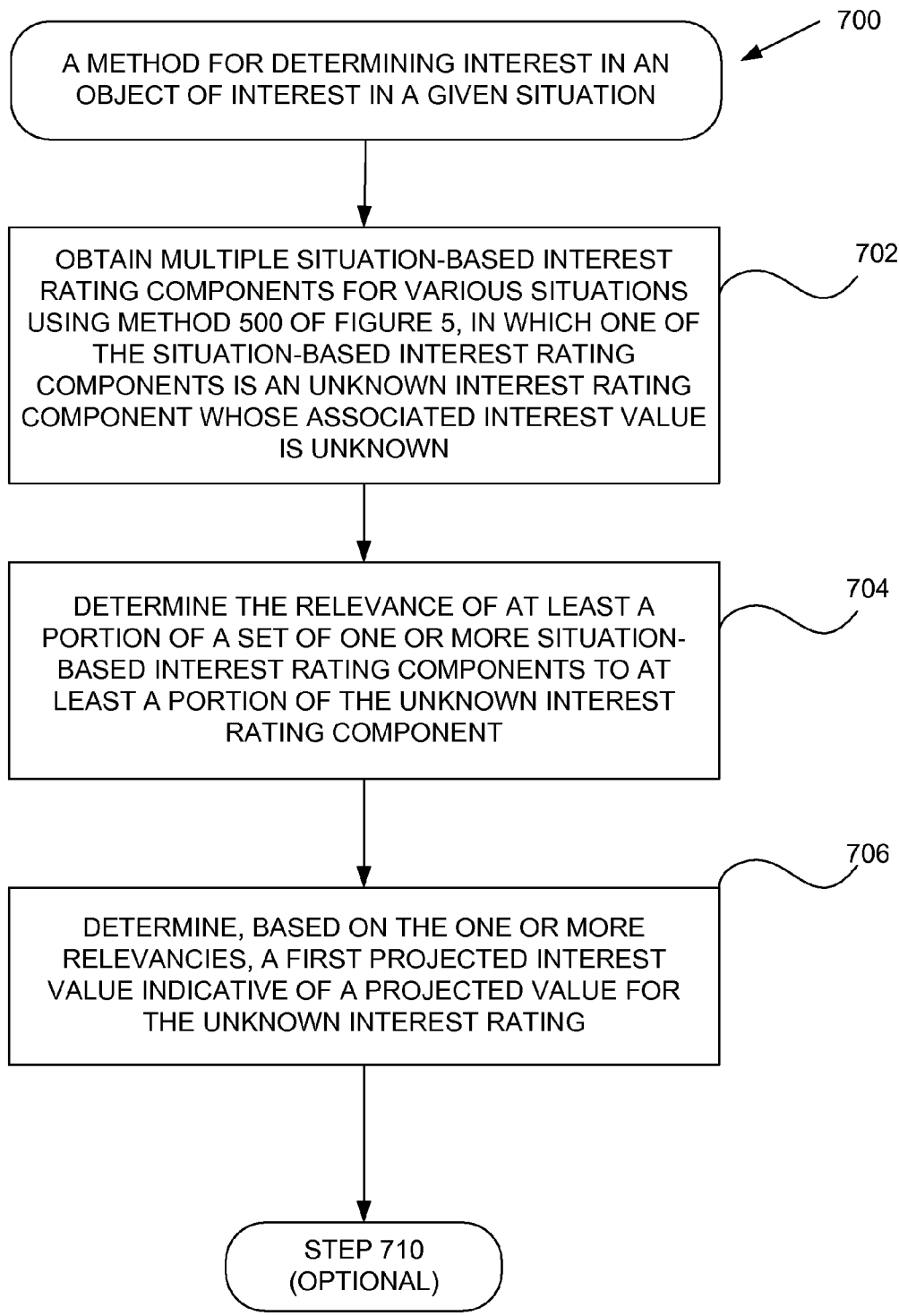
FIGS. 7A and 7B depict an alternative method for determining interest in an object of interest in a given situation in accordance with various embodiments of the invention.
Figure 7B:
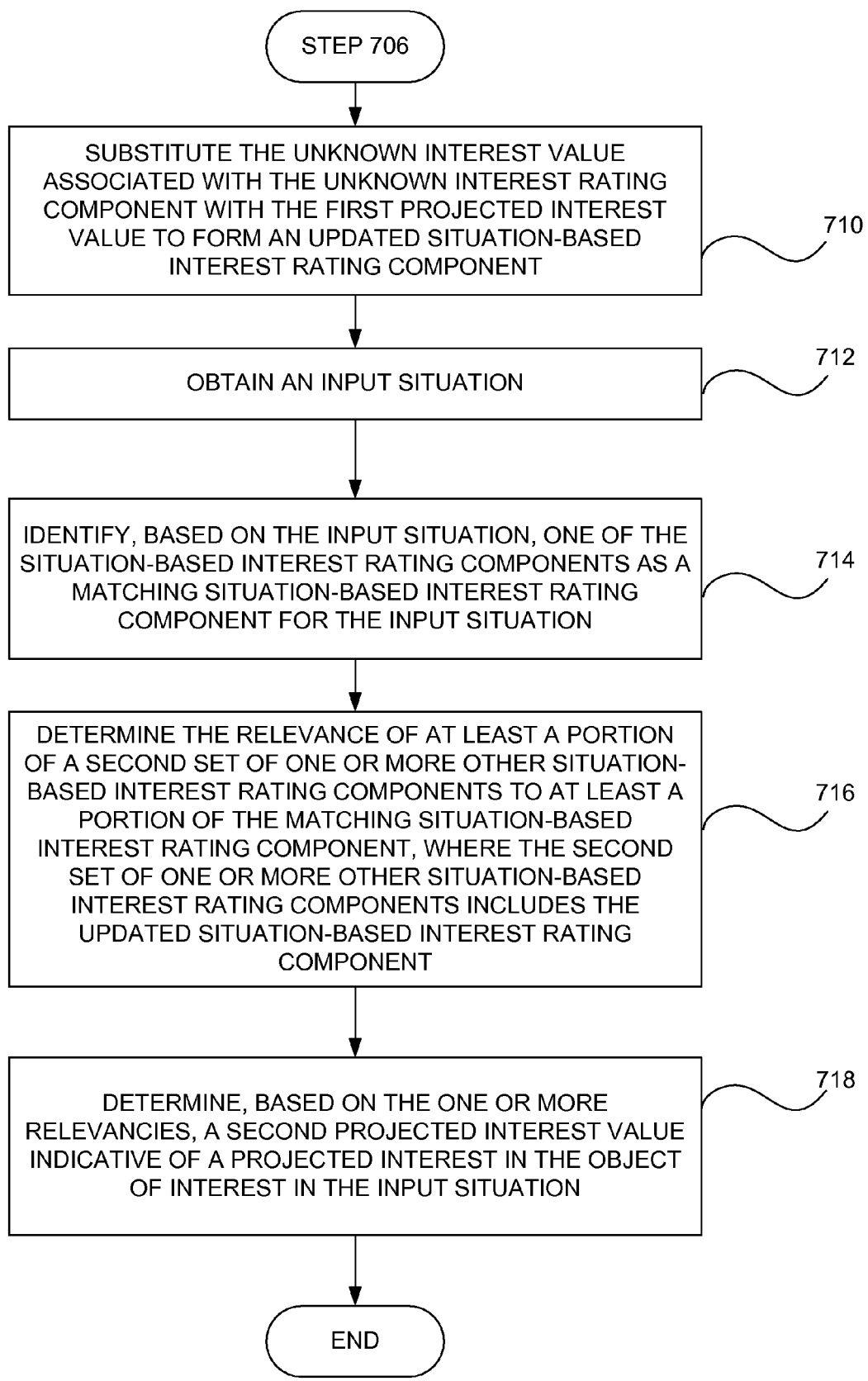

Another embodiment of the invention is presented in FIGS. 7A and 7B. FIGS. 7A and 7B describe a exemplary method 700 that addresses circumstances in which the intensity of a user's interest in an object of interest is unknown or unclear in one or more situations. Method 700 may be used to predict an interest value for one such situation, which in turn may be used to predict interest values for other situations.

Initially, in step 702 of method 700 multiple situation-based interest rating components are obtained. One or more of these components may be generated using method 500 of FIG. 5. One or more of these components is an unknown interest rating component with an unknown interest value. In other words, the interest value of this component is inadequately supported, unclear and/or non-existent. To use a simple example, it may represent a circumstance in which it would be desirable to know the intensity of user A's interests in, say, game applications when user A is at home in the evening, but the intensity of that interest is not known with a sufficient level of certainty.

In step 704, the relevance of one or more situation-based interest rating components to the unknown interest rating component is determined. In some embodiments, this determination is based only on portions of each such component. In certain other embodiments, the determination is based on each of these components as a whole. This operation may take place in a manner similar to aspects of step 510 of FIG. 5. As noted above, the determination of such relevancies may involve the encoding of situations, interest values and/or entire situation-based interest rating components as vectors, and the finding of distances between such vectors.

In step 706, a first projected interest value for the unknown interest rating is determined. This step may take place in a manner similar to step 512 of FIG. 5.

Particular embodiments involve the addition of steps to method 700 of FIG. 7A. One such embodiment is presented in FIG. 7B. In step 710, the unknown interest value for the unknown interest rating component is substituted with the first projected interest value described in step 706 of FIG. 7A. The unknown interest rating component, which previously had an unclear or unsupported interest value associated with it, now has been updated with a new interest value. This updated interest rating component can be used to make further predictions, as outlined in steps 712, 714, 716 and 718.

In step 712, an input situation is obtained. In step 714, one of the situation-based interest rating components is identified as matching the input situation. These steps may be similar to steps 506 and 508 of FIG. 5. In particular embodiments, these steps may identify another situation-based interest rating component that lacks a clear and/or well-supported interest value.

In step 716, the relevance of at least a portion of one or more situation-based interest rating components to at least a portion of the matching situation-based interest component is determined. The group of situation-based interest components that are involved in this determination may or may not be different from the ones referred to in step 704. In many aspects, this step may be performed in a manner similar to step 510 of FIG. 5 and step 704 of FIG. 7A. In step 716, however, the group of components involved in this relevance determination includes the updated interest rating component (formerly, the unknown interest rating component) described in steps 702 and 710 of FIGS. 7A and 7B respectively. Thus, the results of the first prediction, which was determined in step 706 of FIG. 7A, are being used to augment a second prediction, which is described in step 718 of FIG. 7B.

In step 718, a second projected interest value is predicted. This step may be performed in a manner similar to steps 512 and 706 of FIG. 5 and FIG. 7A respectively.

It should be appreciated that steps 702, 704, 706, 710, 712, 714, 716 and 718, in part or in whole, may be repeated numerous times. Particular embodiments involve multiple situation-based interest rating components, in which the components fall into two groups. Some of these components are well-supported and have associated interest values that are believed to be reasonably accurate. Other components in the same group, however, may have defective interest values i.e., interest values that are unclear, non-existent and/or possibly inaccurate. These components raise a concern that, for instance, the preferences or interests of one or more users are unknown in certain types of situations. The steps mentioned above can be used to substitute a defective interest value of a component with an estimated one, which, in a manner of speaking, "repairs" the component. By iterating this process, previously "repaired" components can potentially be used to make predictions for and "repair" other components.

Particular embodiments of the invention offer several advantages. For example, in making predictions, the invention allows for the weighing of numerous different context variables and context values, so that more accurate predictions of an entity's interests can be made. The context variables and values tracked and/or processed by embodiments of the invention can vary greatly, depending on the needs of a particular application. For example, the context variables and values may pertain to geographical factors, physical/biological factors, environmental variables (e.g., location, temperature, presence of nearby devices, GPS signals, components, proximity of human beings, buildings and/or signals, motion, acceleration, velocity etc.) and/or internal variables (e.g., time, open and/or active applications, mode of operation, condition, event, power, force, Internet browsing behavior, pattern of selected ads, direct or indirect feedback from the person etc.).

Another advantage of some embodiments of the invention is their ability to flexibly respond to changing environments and circumstances. For example, in particular embodiments new context values and variables can be easily integrated into the making of future predictions. Some embodiments do not require training or direct feedback from a user about the user's interests, because situation-based interest rating components and predictions can be generated dynamically and/or invisibly from various sources of data, such as observed user behavior. Additionally, certain embodiments need not rely on predetermined rules that prioritize some context variables, context interest, interest objects and/or interest rules over others (e.g., a rule prioritizing a "place" context variable over a "time" variable, etc.). Particular embodiments involve a weighing or prioritization process that is derived entirely from a comparison or distance calculation involving the matching situation-based interest rating component and one or more other situation-based interest rating components (e.g., as described in step 510 of FIG. 5). Certain embodiments do not have or require a rule that predetermines a greater weight for one situation-based interest rating component, context variable, interest object and/or interest value over others prior to the collection of user data, the obtaining of situation-based interest rating components and/or relevance determinations involving one or more of the same.

Another advantage of particular embodiments is that there is no need to cluster data. Particular embodiments of the invention do not involve defining a number of clusters, clustering two or more data points, finding the centers of clusters and/or calculating a distance between a data point and a center of one of the clusters.

An additional advantage is that particular embodiments of the invention can be used to predict the interests of a user without accessing the behavior of other users. That is, in certain embodiments of the invention situation-based interest rating components and predictions may be derived from data collection systems that are limited only to the contexts, behavior and/or characteristics of a single person or a selected group of people. This approach helps to improve privacy.

A number of applications may be envisioned for particular embodiments of the invention. For example, one embodiment involves a client mobile device, such as a cell phone, PDA, health monitor or portable laptop computer, and a server. The client mobile device has a communication link with the server so that data can be exchanged between them. The client mobile device may store a log of the person's behavior and possibly transmit it to the server for long-term storage and processing. Such log data could be transformed into data associations or some other format and stored in a computer readable medium. Portions or all of the log data could be processed by the server to obtain situation-based interest rating components. For example, data parsing could unveil that the person typically has a high level of interest in spreadsheet applications at work in the morning and has on average a low level of interest in spreadsheet applications at home in the evening. The client mobile device may also be used to obtain the input situation (e.g., as described in step 506 of FIG. 5) and transmit it the server. The client mobile device, for example, may inform the server that the person is currently near a specific retail outlet, in motion and in downtown New York. The server could use various situation-based interest rating components and the input situation to make a prediction of the person's interest in an object of interest in accordance with steps 508, 510 and 512 of FIG. 5. For example, the server could predict that the person would have a high degree of interest in consumer electronics and retail advertisements, in part because the person is out shopping and has shown such a pattern of interest under similar circumstances in the past.

In some embodiments, an action may be taken based on a prediction once it is determined that the predicted interest level has reached a certain threshold. Particular embodiments of the invention involve identifying situations, as characterized by specific combinations of context values, that prompt the running of an application, because of an earlier prediction that the interest levels for one or more interest objects is particularly high when that particular combination of context values arises. In the above example, a server may calculate that a user's interest level in retail advertisements and electronics is high when the device (and therefore the person) is in motion and near specific retail outlets. The mobile device may transmit an alert to the server when the mobile device detects that such conditions have arisen. In response, the server may direct the mobile device to transmit ads or suggestions to the person relating directly or indirectly to shopping and consumer electronics. Many variations on the above example are possible.

It should be noted that the techniques of the invention can use the techniques for predicting interest described in U.S. patent application Ser. No. 12/343,392, entitled: "RATING-BASED INTERESTS IN COMPUTING ENVIRONMENTS AND SYSTEMS," which is hereby incorporated by references herein for all purposes.

It should also be noted that techniques for predicting interest are also described in U.S. patent application Ser. No. 12/343,395, entitled: "CONTEXT-BASED INTERESTS IN COMPUTING ENVIRONMENTS AND SYSTEMS," which is hereby incorporated by references herein for all purposes.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of generating an interest value for a first input situation, comprising:
    obtaining a first input situation represented by at least a first context variable of a plurality of context variables;
    obtaining data including interest values for said plurality of context variables, wherein said data includes first data pertaining to the first input situation and other data pertaining to one or more other situations;
    (a) determining whether the first context variable is associated with a discrete range of values or a continuous range of values;
    (b) determining at least a portion of said other data pertaining to one or more other situations to be proximate data proximate to said first input situation when said determining (a) determines that said first context variable is associated with a continuous range of values; and
    generating, based on said proximate data pertaining to said one or more other situations and said first data pertaining to the first input situation, an interest value for said first input situation wherein:
    said first context variable of said first input situation has a first input situation context value from a range of possible context values;
    said data includes a plurality of data associations, each data association including a first data association context variable and a data association interest value, said first data association context variable having a value from said range of possible context values;
    said proximate data includes a proximate data association subset of the plurality of data associations, each data association in said proximate data association subset having a value for said first data association context variable that is in close proximity to said first input situation context value along the range of possible context values; and
    the interest value for said first input situation is based on the data association interest values of the data associations in said proximate data association subset.

2. The computer-implemented method of claim 1, wherein the first input situation comprises a second context variable of the plurality of context variables and wherein the method further comprises:
    (c) determining whether the second context variable is associated with a discrete range of values or a continuous range of values;
    (d) determining whether said portion of said other data pertaining to one or more other situations pertains to the value of said second variable of said first input situation,
    wherein determining (b) comprises determining at least a portion of said other data pertaining to one or more other situations to be proximate data proximate to said first input situation when said determining (a) determines that said first context variable is associated with a continuous range of values and when determining (c) determines that said second context variable is associated with a discrete range of values and determining (d) determines that said portion of said other data pertains to the value of said second context variable of said first input situation.

3. The computer-implemented method of claim 2, wherein the first context variable pertains to time and the second context variable pertains to a location.

4. The computer-implemented method of claim 1, wherein the first context variable pertains to time.

5. The computer-implemented method of claim 1, wherein said interest value for said first input situation is based on an average of the data association interest values of the data associations in said proximate data association subset.

6. The computer-implemented method of claim 1, wherein values in close proximity to the first context value are values in said range of possible context values that form a continuous, sequential band around or on one side of the first context value in said range of possible context values.

7. A computer-implemented method of generating an interest value for a first input situation, comprising:
obtaining a first input situation represented by at least first and second context variables;
obtaining data including interest values for a plurality of context variables including said first and second context variables, wherein said data includes first data pertaining to the first input situation and other data pertaining to one or more other situations;
(a) determining whether said first context variable is associated with a discrete range of values or a continuous range of values;
(b) determining whether values of said second context variable of said other data are within an acceptable range of the value of said second variable of said first input situation when said determining (a) determines that said first context variable is associated with said discrete range of values;
(c) determining at least a portion of said other data pertaining to one or more other situations to be proximate data proximate to said first input situation when said determining (b) determines that said values of said second variable of said other data are within an acceptable range of the value of said second variable of said first input situation; and
generating, based on said proximate data pertaining to said one or more other situations and said first data pertaining to the first input situation, an interest value for said first input situation wherein:
said second context variable for the first input situation has a first input situation-based context value from a range of possible context values;
said data includes a plurality of data associations, each data association including a first data association context variable, a second data association context variable and a data association interest value, said second data association context variable having a value from said range of possible context values;
said proximate data includes a proximate data association subset of the plurality of data associations, each data association in said proximate data association subset having a value for said second data association context variable that is in close proximity to said first input situation-based context value on the range of possible context values; and
the interest value for said first input situation is based on the data association interest values of the data associations in said proximate data association subset.

8. The computer-implemented method of claim 7, wherein the second context variable pertains to time.

9. The computer-implemented method of claim 8, wherein the first context variable pertains to a location.

10. The computer-implemented method of claim 7, wherein the interest value for said first input situation is based on an average of the data association interest values of the data associations in said proximate data association subset.

11. The computer-implemented method of claim 7, wherein values for said first context variable in each one of the data associations of said proximate data association subset are the same.

12. The computer-implemented method of claim 7, wherein values in close proximity to the first context value are values in said range of possible context values that form a continuous, sequential band around or on one side of the position of the first situation-based context value in said range of possible context values.

13. The computer-implemented method of claim 1 wherein said interest value generated based on said proximate data is a computed interest value for a generated situation-based interest rating component, said computed interest value indicative of interest in said object of interest in said first input situation and wherein the method further comprises:
obtaining a plurality of situation-based interest rating components for a plurality of situations, said plurality of situation-based interest rating component including said generated situation-based interest rating component, wherein each one of said plurality of situation-based interest rating components includes an interest value indicative of interest in said object of interest in one of said plurality of situations, each one of the plurality of situations effectively represented by said plurality of context variables, each one of said plurality of context variables having an associated plurality of possible context values;
obtaining a second input situation that is effectively represented by a plurality of input context values;
identifying, based on said second input situation, one of said plurality of situation-based interest rating components as a matching situation-based interest rating component for said input situation;
determining the relevance of at least a portion of one or more other situation-based interest rating components to said matching situation-based interest rating component; and
determining, based on said one or more relevancies, a projected interest value indicative of a projected interest in said object of interest in said second input situation.

14. The computer-implemented method of claim 13, wherein said determining of relevance comprises one or more of the following:
determining the relevance of situations of said one or more other situation based interest rating components to a matching situation of said matching situation-based interest rating component;
determining the relevance of interest values of said one or more other situation-based interest rating components to a matching interest value of said matching situation-based interest rating component; and
determining the relevance of said one or more other situation-based interest rating components as a whole to said matching situation-based interest rating component considered as a whole.

15. The computer-implemented method of claim 14, wherein each of said plurality of situation-based interest ratings components are represented in a vector form.

16. The computer-implemented method of claim 15, wherein determining the relevance of said one or more other situation-based interest rating components as a whole comprises considering entire said vector forms.

17. The computer-implemented method of claim 14, wherein:
at least one of said situation-based interest rating components is an unknown interest rating component that includes an unknown interest value; and
said determining of the relevance of interest values of said one or more other situation-based interest rating components comprises: not considering said unknown interest value.

18. The computer-implemented method of claim 13, wherein at least one of said situation-based interest rating components is an average-based interest rating component that includes an average interest value.

19. The computer-implemented method of claim 18, wherein said method further comprises:
    determining said average interest value by considering only a plurality of known interest values associated with occurrence of a situation represented by said average-based interest rating component.

20. The computer-implemented method of claim 13, wherein said method further comprises:
    assigning an initial value to an unknown interest value, said unknown interest value having a range of possible interest values;
    updating said initial value based on one or more of the following: a) the projected interest value; and b) an approximate midpoint of the range of possible interest values.

21. The computer-implemented method of claim 13, wherein said method further comprises:
    obtaining data relating to a set of data associations, each one of the set of data associations including an associated data association situation and an associated data association interest value, the associated data association situation including two or more data association context variables, each one of said data association context variables having a plurality of possible data association context values, wherein said obtaining of the plurality of situation-based interest rating components includes averaging the data association interest values associated with a subset of the set of data associations, the subset including two or more data associations that have the same situation.

22. The computer-implemented method of claim 13, wherein:
    a first one of the plurality of situation-based interest rating components has at least two context variables, values of the at least two context variables encoded as at least a portion of a first multi-dimensional vector;
    at least two of the input context values of the second input situation are encoded as at least a portion of a second multi-dimensional vector;
    the predicting of the projected interest level uses a weighted sum, the weighted sum being based at least partly on the calculating of a distance between the first multi-dimensional vector and the second multi-dimensional vector.

23. The computer-implemented method of claim 22, wherein the calculating of the distance includes at least one of a group consisting of: a) calculating a cosine distance; and b) calculating a Euclidean distance.

24. The computer-implemented method of claim 13, wherein a first one of the context variables is encoded using 1-in-N encoding, N being an integer equal to the number of possible context values associated with the first one of the context variables, such that the first one of the context variables is encoded as a vector with N values.

25. A computing system, wherein said computing system is operable to:
    obtain a first input situation represented by at least a first context variable;
    obtain data including interest values for a plurality of context variables including said first context variable, wherein said data includes first data pertaining to the first input situation and other data pertaining to one or more other situations;
    (a) determine whether the first context variable is associated with a discrete range of values or a continuous range of values;
    (b) determine at least a portion of said other data pertaining to one or more other situations to be proximate data to said first input situation when said determining (a) determines that said first context variable is associated with a continuous range of values;
    generate, based on said proximate data pertaining to said one or more other situations and said first data pertaining to the first input situation, an interest value for said first input situation wherein:
    said first context variable of said first input situation has a first input situation context value from a range of possible context values;
    said data includes a plurality of data associations, each data association including a first data association context variable and a data association interest value, said first data association context variable having a value from said range of possible context values;
    said proximate data includes a proximate data association subset of the plurality of data associations, each data association in said proximate data association subset having a value for said first data association context variable that is in close proximity to said first input situation context value along the range of possible context values; and
    the interest value for said first input situation is based on the data association interest values of the data associations in said proximate data association subset.

26. The computing system of claim 25, wherein at least one of the context variables is based on one or more of the following:
    a) an environmental factor and/or element;
    b) an environmental factor and/or element associated with one or more humans interacting with one or more applications on the computing system;
    c) environmental context of use associated with an environment of one or more humans as they interact with one or more active applications on the computing system;
    d) a geographical and/or physical factor and/or element;
    e) time, date, location, mode, mode of operation, condition, event, temperature, speed and/or acceleration of movement, power and/or force;
    f) presence of one or more external components and/or devices;
    g) presence of one or more active components operating on one or more external devices in a determined proximity of said device; and
    h) one or more physiological and/or biological conditions associated with one or more persons interacting with the computing system.

27. A computer readable storage medium embodied in a tangible form that includes executable computer code operable to generating an interest value for a first input situation, including:
    executable computer code operable to obtain a first input situation represented by at least a first context variable;
    executable computer code operable to obtain data including interest values for a plurality of context variables including said first context variable, wherein said data includes first data pertaining to the first input situation and other data pertaining to one or more other situations;
    executable computer code operable to (a) determine whether the first context variable is associated with a discrete range of values or a continuous range of values;

executable computer code operable to (b) determine at least a portion of said other data pertaining to one or more other situations to be proximate data to said first input situation when said determining (a) determines that said first context variable is associated with a continuous range of values; and generating, based on said proximate data pertaining to said one or more other situations and said first data pertaining to the first input situation, an interest value for said first input situation wherein:

said first context variable of said first input situation has a first input situation context value from a range of possible context values;

said data includes a plurality of data associations, each data association including a first data association context variable and a data association interest value, said first data association context variable having a value from said range of possible context values;

said proximate data includes a proximate data association subset of the plurality of data associations, each data association in said proximate data association subset having a value for said first data association context variable that is in close proximity to said first input situation context value along the range of possible context values; and the interest value for said first input situation is based on the data association interest values of the data associations in said proximate data association subset.

28. The computer-implemented method of claim 1 further comprising displaying information to a user based on the generated interest value for the said first input situation.

29. The computer-implemented method of claim 7 further comprising displaying information to a user based on the generated interest value for said first input situation.

30. A computing system, wherein said computing system is operable to:

obtain a first input situation represented by at least a first context variable;

obtain data including interest values for a plurality of context variables including said first context variable, wherein said data includes first data pertaining to the first input situation and other data pertaining to one or more other situations;

(a) determine whether the first context variable is associated with a discrete range of values or a continuous range of values;

(b) determine at least a portion of said other data pertaining to one or more other situations to be proximate data to said first input situation when said determining (a) determines that said first context variable is associated with a continuous range of values;

generate, based on said proximate data pertaining to said one or more other situations and said first data pertaining to the first input situation, an interest value for said first input situation wherein:

said first context variable of said first input situation has a first input situation context value from a range of possible context values;

said data includes a plurality of data associations, each data association including a first data association context variable and a data association interest value, said first data association context variable having a value from a range of possible context values;

said proximate data includes a proximate data association subset of the plurality of data associations, each data association in said proximate data association subset having a value for said first data association context variable that is in close proximity to said first input situation context value; and the interest value for said first input situation is based on the data association interest values of the data associations in said proximate data association subset.

31. The computer system of claims 30 wherein the computing system is further operable to display information to a user based on the generated interest value for said first input situation.

* * * * *